(12) United States Patent
Sakai et al.

(10) Patent No.: US 10,939,252 B2
(45) Date of Patent: *Mar. 2, 2021

(54) WIRELESS COMMUNICATION APPARATUS, WIRELESS COMMUNICATION METHOD, AND PROGRAM FOR USING A THRESHOLD TO CONTROL MULTICAST RETRANSMISSION

(71) Applicant: Sony Corporation, Tokyo (JP)

(72) Inventors: Eisuke Sakai, Tokyo (JP); Takeshi Itagaki, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,046

(22) Filed: Jul. 18, 2019

(65) Prior Publication Data

US 2019/0342723 A1 Nov. 7, 2019

Related U.S. Application Data

(63) Continuation of application No. 15/313,293, filed as application No. PCT/JP2015/066357 on Jun. 5, 2015, now Pat. No. 10,412,553.

(30) Foreign Application Priority Data

Jun. 30, 2014 (JP) .............................. JP2014-134662

(51) Int. Cl.
*H04L 12/855* (2013.01)
*H04W 4/06* (2009.01)
(Continued)

(52) U.S. Cl.
CPC ............. *H04W 4/06* (2013.01); *H04L 1/1861* (2013.01); *H04L 12/185* (2013.01);
(Continued)

(58) Field of Classification Search
CPC ........ H04N 21/6375; H04N 21/64776; H04W 52/48; H04W 4/806; H04W 4/06;
(Continued)

(56) References Cited

U.S. PATENT DOCUMENTS

| 10,412,553 B2* | 9/2019 | Sakai | ..................... H04W 4/06 |
| 2002/0028687 A1* | 3/2002 | Sato | ..................... H04L 1/1854 |
| | | | 455/466 |

(Continued)

FOREIGN PATENT DOCUMENTS

| JP | 11-17713 A | 1/1999 |
| JP | 11-225168 A | 8/1999 |

(Continued)

OTHER PUBLICATIONS

Office Action issued in Japanese Application 2016-531214 dated Oct. 23, 2019.
International Search Report dated Aug. 25, 2015 in PCT/JP2015/066357 filed Jun. 5, 2015.

*Primary Examiner* — Salvador E Rivas
(74) *Attorney, Agent, or Firm* — Xsensus LLP

(57) ABSTRACT

To make it possible to perform retransmission control in which wireless resources are more efficiently utilized, a wireless communication apparatus includes: a wireless communication unit configured to perform wireless communication with a terminal apparatus; a communication control unit configured to control multicast transmission performed by the wireless communication unit; and a setting unit configured to set a threshold for determining whether or not it is necessary for the communication control unit to perform a retransmission process, on the basis of information about reception of a reception acknowledgment response corresponding to the multicast transmission from the terminal apparatus.

8 Claims, 10 Drawing Sheets

(51) Int. Cl.
*H04L 12/927* (2013.01)
*H04L 12/18* (2006.01)
*H04W 28/04* (2009.01)
*H04L 1/18* (2006.01)
*H04L 5/00* (2006.01)
*H04N 21/647* (2011.01)
*H04W 80/08* (2009.01)
*H04W 36/30* (2009.01)

(52) U.S. Cl.
CPC ........ *H04L 47/2466* (2013.01); *H04L 47/806* (2013.01); *H04W 28/04* (2013.01); *H04L 5/0055* (2013.01); *H04L 12/189* (2013.01); *H04N 21/64776* (2013.01); *H04W 36/305* (2018.08); *H04W 80/08* (2013.01)

(58) Field of Classification Search
CPC .. H04W 36/305; H04W 80/08; H04L 1/1858; H04L 1/189; H04L 1/1825; H04L 1/1896; H04L 1/1861; H04L 47/2466; H04L 47/806
See application file for complete search history.

(56) References Cited

U.S. PATENT DOCUMENTS

| | | | |
|---|---|---|---|
| 2008/0019398 A1 | 1/2008 | Genossar et al. | |
| 2010/0251056 A1* | 9/2010 | Dinan | H04L 1/1812 714/749 |
| 2011/0305158 A1* | 12/2011 | Kim | H04W 72/005 370/252 |
| 2013/0235781 A1* | 9/2013 | Dangui | H04L 1/1614 370/312 |
| 2014/0185458 A1* | 7/2014 | Yoo | H04W 24/08 370/242 |

FOREIGN PATENT DOCUMENTS

| | | |
|---|---|---|
| JP | 2002-124935 A | 4/2002 |
| JP | 2006-238423 A | 9/2006 |
| JP | 2007-166233 A | 6/2007 |
| JP | 2008-252626 A | 10/2008 |
| JP | 2012-504352 A | 2/2012 |
| JP | 2013-157706 A | 8/2013 |
| JP | 2014-017549 A | 1/2014 |
| JP | 2014-103582 A | 6/2014 |

* cited by examiner

WIRELESS COMMUNICATION APPARATUS, WIRELESS COMMUNICATION METHOD, AND PROGRAM FOR USING A THRESHOLD TO CONTROL MULTICAST RETRANSMISSION

CROSS-REFERENCE TO RELATED APPLICATIONS

This application is a continuation of U.S. application Ser. No. 15/313,293, filed Nov. 22, 2016, which is based on PCT filing PCT/JP2015/066357, filed Jun. 5, 2015, and claims priority to JP 2014-134662, filed Jun. 30, 2014, the entire contents of each are incorporated herein by reference.

TECHNICAL FIELD

The present disclosure relates to wireless communication apparatuses, wireless communication methods, and programs.

BACKGROUND ART

Among the communication techniques in wireless systems is multicast communication. Multicast communication is a communication technique of transmitting a single piece of data to one or more wireless terminals belonging to a multicast group as transmission destinations simultaneously. Multicast communication allows for efficient utilization of wireless resources, and therefore, is employed in various services, and there is a demand for an improvement in techniques related to multicast communication.

For example, Patent Literature 1 below discloses a technique of when data has been transmitted using multicast communication, determining whether or not to perform retransmission on the basis of whether or not the number of terminals which are transmission destinations is equal to the number of reception acknowledgment responses received from terminals which are transmission destinations.

CITATION LIST

Patent Literature

Patent Literature 1: JP H11-17713A

SUMMARY OF INVENTION

Technical Problem

According to the above technique disclosed in the Patent Literature 1, retransmission is performed until a reception acknowledgment response has been received from all terminals that are multicast transmission destinations. However, in wireless communication, if retransmission is repeatedly performed until a reception acknowledgment response has been received from all terminals, retransmission is more frequently performed as the number of wireless terminals belonging to a multicast group increases, so that wireless resources are infinitely consumed. As denser wireless networks are being currently constructed, it is desirable that such a waste of wireless resources should be avoided. With this in mind, the present disclosure proposes a novel and improved wireless communication apparatus, wireless communication method, and program which can perform retransmission control in which wireless resources are more efficiently utilized.

Solution to Problem

According to the present disclosure, there is provided a wireless communication apparatus including: a wireless communication unit configured to perform wireless communication with a terminal apparatus; a communication control unit configured to control multicast transmission performed by the wireless communication unit, and a setting unit configured to set a threshold for determining whether or not it is necessary for the communication control unit to perform a retransmission process, on the basis of information about reception of a reception acknowledgment response corresponding to the multicast transmission from the terminal apparatus.

According to the present disclosure, there is provided a wireless communication method for use in a wireless communication apparatus which performs wireless communication with a terminal apparatus, the method including: controlling multicast transmission using a processor, and setting a threshold for determining whether or not it is necessary to perform a retransmission process, on the basis of information about reception of a reception acknowledgment response corresponding to the multicast transmission from the terminal apparatus.

According to the present disclosure, there is provided a program for causing a computer to function as: a wireless communication unit configured to perform wireless communication with a terminal apparatus; a communication control unit configured to control multicast transmission performed by the wireless communication unit; and a setting unit configured to set a threshold for determining whether or not it is necessary for the communication control unit to perform a retransmission process, on the basis of information about reception of a reception acknowledgment response corresponding to the multicast transmission from the terminal apparatus.

Advantageous Effects of Invention

As described above, according to the present disclosure, retransmission control in which wireless resources are more efficiently utilized can be performed. Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
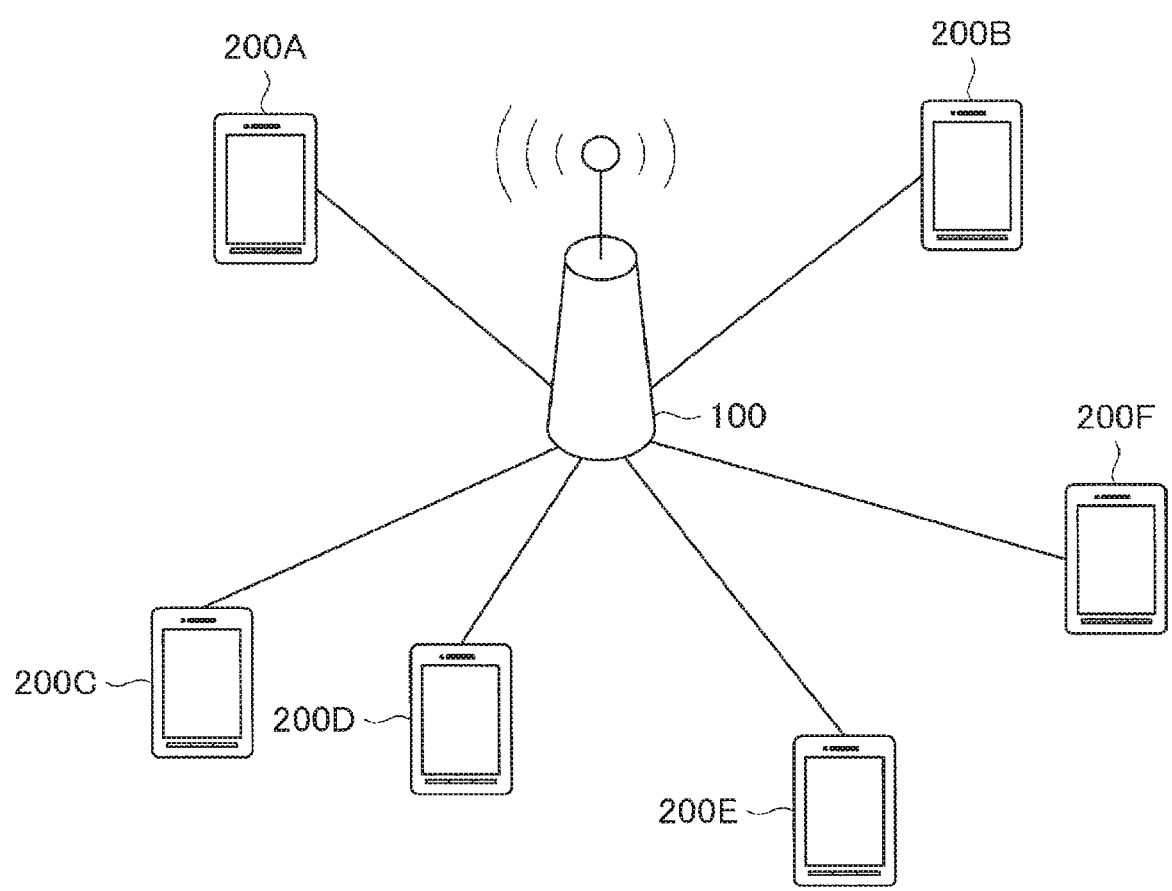
FIG. 1 is an illustrative diagram for describing an overview of a communication system according to a first embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in the present specification and drawings, elements having substantially the same functional configuration may be distinguished from each other by adding different letters of the alphabet to the same reference sign. For example, a plurality of elements having substantially the same functional configuration are distinguished from each oilier when necessary, like wireless terminals 200A, 200B, and 200C. Note that when it is not necessary to particularly distinguish a plurality of elements having substantially the same functional configuration from each other, the elements are denoted by only the same reference sign. For example, when it is not necessary to particularly distinguish wireless terminals 200A, 200B, and 200C from each other, the wireless terminals 200A, 200B, and 200C are simply referred to as the wireless terminals 200.

Note that description will be provided in the following order.
1. Introduction
2. First embodiment
2-1. Overview of communication system
2-2. Configuration examples of base station
2-3. Operation process examples
2-4. Variation 1
2-5. Variation 2
3. Second embodiment
3-1. Configuration examples of base station
3-2. Operation process examples
4. Application examples
5. Conclusion 1. Introduction Firstly, techniques and discussions related to multicast communication will be described.
(Communication Techniques)
Communication techniques in wireless systems include, for example, unicast communication, multicast communication, and broadcast communication. These communication techniques are employed for communication between a base station and a terminal device in, for example, a wireless local area network (LAN) system. Note that the terminal device is a wireless terminal connected to a base station.
Unicast Communication
Unicast communication is a communication technique used in one-to-one data transmission. For example, unicast communication is used when a base station transmits data to a single terminal device. However, in unicast communication, for example, when a base station transmits the same data to a plurality of terminal devices, a frame is transmitted to terminal devices separately, and therefore, the efficiency of utilization of wireless resources is low. Meanwhile, in unicast communication, if a protocol is specified so that a reception acknowledgement request is transmitted to each terminal device, and a reception acknowledgment response (ACK) is received from a terminal device which has succeeded in reception, retransmission is perforated with respect to a terminal device which has failed to receive a frame so that frame dropping can be reduced. Note that a frame transmitted using unicast communication is also referred to as a unicast frame. Also, to transmit a unicast frame is also referred to as unicast transmission Multicast Communication
Multicast communication is a communication technique used in one-to-many data transmission. For example, multicast communication is used when a base station transmits the same data to one or more terminal devices belonging to a predetermined group. This group is also referred to as a multicast group. In multicast communication, a single piece of data can be transmitted to a plurality of terminal devices simultaneously. Therefore, the efficiency of utilization of wireless resources is higher in multicast communication than in unicast communication. Note that a typical wireless communication system is not provided with a mechanism for performing retransmission of a frame which has been transmitted using multicast communication, and therefore, it is difficult to reduce frame dropping. Note that a frame transmitted using multicast communication is also referred to as a multicast frame. Also, to transmit a multicast frame is also referred to as multicast transmission.

Broadcast Communication
Broadcast communication is a communication technique used in one-to-many data transmission. For example, broadcast communication is used when a base station transmits the same data to all wireless terminals present within a range in which a frame transmitted from the base station can be sensed. Broadcast communication is typically used for transmission of a beacon frame which is used when a base station notifies of its presence, or the like.

In the foregoing, each communication technique in a wireless system has been described.
(Retransmission Control in Multicast Communication)

As a mechanism for retransmission control involved in multicast communication, a mechanism for performing retransmission until a reception acknowledgment response has been received from all terminal devices belonging to a multicast group, is conceived of. However, when a transmitter repeatedly performs retransmission until a reception acknowledgment response has been received from all terminal devices, retransmission is more frequently performed as the number of terminal devices belonging to a multicast group increases, so that wireless resources are infinitely consumed.

With this in mind, in each embodiment of the present disclosure, a mechanism is provided in which when a reception acknowledgment response has been received from a portion of the terminal devices belonging to a multicast group, it is assumed that multicast transmission has been successful, and retransmission will not be performed. Specifically, in this embodiment, a threshold is introduced in order to determine whether or not multicast transmission has been successful. As a result, the number of times of retransmission and the number of times of transmission of a reception acknowledgment response accompanying retransmission, can be reduced. Furthermore, in this embodiment, by introducing a mechanism for dynamically changing this threshold, mere efficient utilization of wireless resources is achieved. Also, in this embodiment, a retransmission method and a retransmission timing are determined, depending on a terminal device requiring retransmission, whereby retransmission can be more efficiently performed. Thus, according to each embodiment of the present disclosure, the number of times of retransmission, and the number of times of transmission of a reception acknowledgment response accompanying retransmission, are reduced, and in addition, retransmission is performed using a more appropriate retransmission method and retransmission timing. As a result, an improvement in efficiency of utilization of wireless resources in multicast communication and an improvement in system throughput are achieved.

2. First Embodiment

[2-1 Overview of Communication System]

Firstly, an overview of a communication system according to this embodiment will be described with reference to FIG. 1.

FIG. 1 is an illustrative diagram for describing the overview of the communication system according to this embodiment. As shown in FIG. 1, the communication system 1 includes a base station 100 and a plurality of wireless terminals 200 (i.e., wireless terminals 200A, 200B, 200C, 200D, 200E, and 20F). The communication system 1 is, for example, a system compliant with wireless LAN or a communication technique similar to this.

The base station 100 is a wireless communication apparatus corresponding to a base device which is a center of the communication system 1. The base station 100 may be connected to an external network, such as the Internet or the like, by wire or wirelessly. For example, the base station 100 may be an access point in a wireless FAN system.

The wireless terminals 200 are each a wireless communication apparatus corresponding to a terminal device which is wirelessly connected to the base station 100 for communication. In FIG. 1, dashed lines indicate that the wireless terminals 200 are wirelessly connected to the base station 100. For example, the wireless terminals 200 may be a station in a wireless LAN system.

It is hereinafter assumed that the wireless terminal 200A to 200F belong to the same multicast group. Needless to say, not all of the wireless terminals 200 wirelessly connected to the base station 100 may belong to the same multicast group.

The base station 100 performs multicast communication. Specifically, the base station 100 transmits the same multicast frame to the wireless terminals 200A to 200F belonging to the same multicast group.

A wireless terminal 200 which has succeeded in receiving a multicast frame transmits a reception acknowledgment response (ACK frame) back to the base station 100. The wireless terminals 200 may transmit a reception acknowledgment response back at different timings or in a time-division multiplexing manner. Also, the base station 100 may explicitly request the wireless terminals 200 within the coverage thereof to transmit an ACK frame back.

The base station 100 performs retransmission control on a frame which has been transmitted using multicast communication, on the basis of information about reception of an ACK frame transmitted back from it wireless terminal 200.

In the foregoing, an overview of the communication system 1 according to this embodiment has been described.

Next, a configuration example of the base station 100 according to this embodiment will be described with reference to FIG. 2.

[2-2. Configuration Examples of Base Station]

Figure 2:
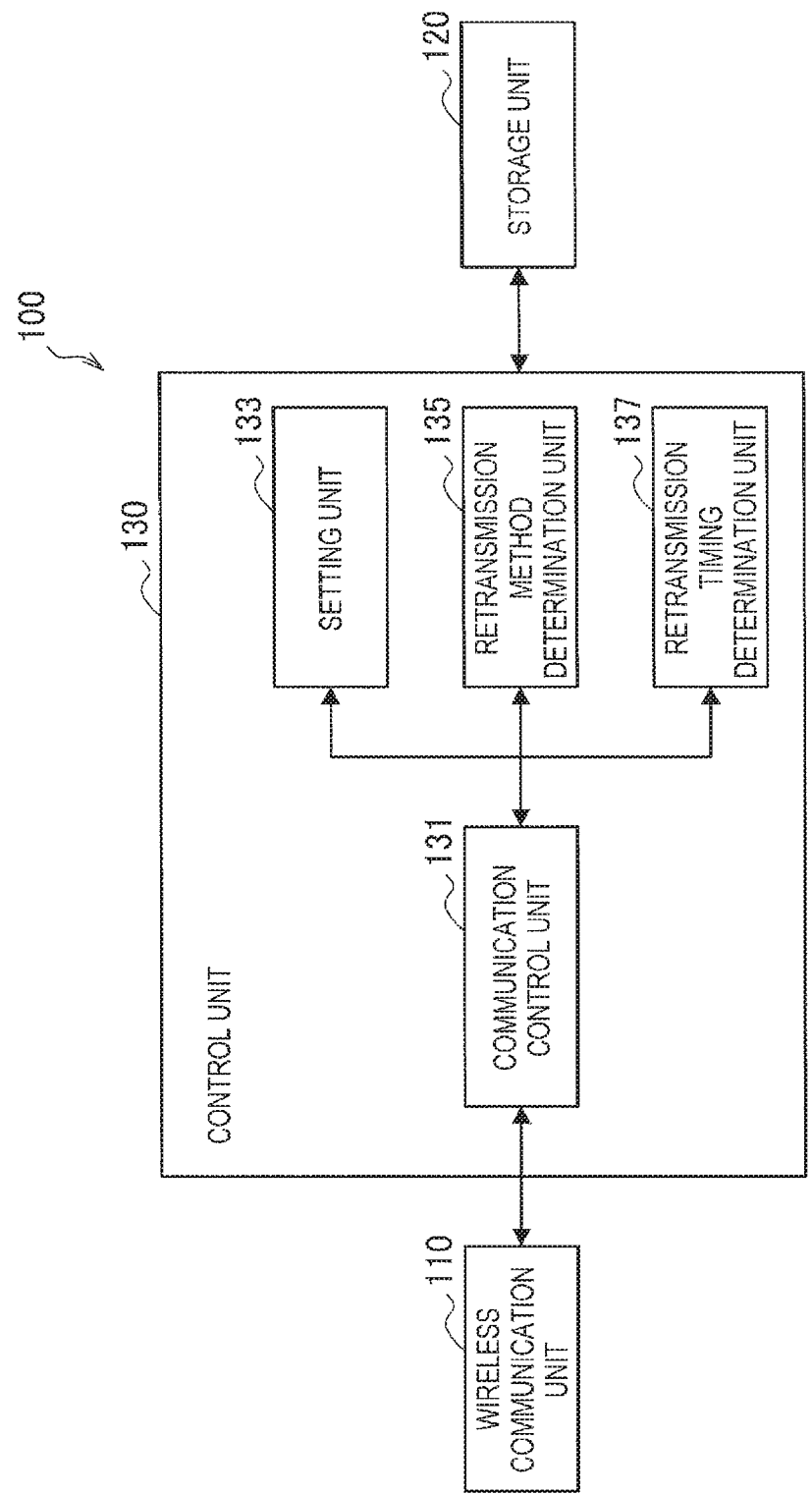
FIG. 2 is a block diagram showing a logical configuration example of a base station according to the first embodiment.

FIG. 2 is a block diagram showing a logical configuration example of the base station 100 according to this embodiment. As shown in FIG. 2, the base station 100 has a wireless communication unit 110, a storage unit 120, and a control unit 130.

(1) Wireless Communication Unit 110

The wireless communication unit 110 is a wireless communication interface which mediates wireless communication of the base station 100 with other devices. In this embodiment, the wireless communication unit 110 performs wireless communication with the wireless terminals 200. For example, the wireless communication unit 110 receives wireless signals transmitted from the wireless terminals 200. The wireless communication unit 110 may function as, for example, an amplifier, frequency converter, demodulator, or the like, and output received data the control unit 130. Also, the wireless communication unit 110 transmits a wireless signal to the wireless terminals 200 through an antenna. The wireless communication unit 110 may function as, for example, a modulator, amplifier, and the like, and perform modulation and power amplification or the like on data output from the control unit 130, and transmit the resultant data.

For example, the wireless communication unit 110 according to this embodiment transmits a multicast frame. Thereafter, the wireless communication unit 110 receives an ACK frame transmitted back from a wireless terminal 200 which has succeeded in receiving the multicast frame. Note that, in addition to multicast communication, the wireless communication unit 110 can transmit data using unicast communication or broadband communication.

The wireless communication unit 110 may perform beamforming. For example, the wireless communication unit 110 may transmit a unicast frame, or perform beamforming to transmit a unicast frame, to any one of the wireless terminals 200. Similarly, the wireless communication unit 110 may transmit a multicast frame, or perform beamforming to transmit a multicast frame, to any one or more of the wireless terminals 200. Beamforming is a technique of performing transmission with directivity in a particular direction so that the possibility that a wireless terminal in the particular direction will succeed in receiving a wireless signal can be improved. Typically, bean forming can be performed with respect to a wireless terminal having a high channel correlation.

The wireless communication unit 110 may perform beamforming during frame retransmission. In this case, not only the possibility that a wireless terminal 200 requiring retransmission will succeed in receiving a frame increases, but also the possibility that another wireless terminal 200 will succeed in receiving the frame and transmit an ACK frame back decreases. For example, in the example shown in FIG. 1, it is assumed that an ACK frame corresponding to multicast transmission from the base station 100 is not transmitted back from the wireless terminals 200E and 200F. In this case, if the base station 100 performs beamforming which imparts directivity in the directions of the wireless terminal 200E and 200F, the possibility that the wireless terminal 200E and 200F will succeed in receiving a retransmitted frame can be increased. Meanwhile, if the wireless terminals 200A to 200D succeed in receiving a retransmitted frame, the wireless terminals 200A to 200D will transmit an ACK frame again. If the base station 100 performs beamforming which imparts directivity in the directions of the wireless terminals 200E and 200F, the probability that the wireless terminals 200A to 200D will fail to receive a retransmitted frame can be increased. Thus, by performing beamforming during frame retransmission, the base station 100 can decrease the possibility that an unnecessary ACK frame will be transmitted, and thereby increase the system throughput.

For example, when there are a plurality of wireless terminals 200 to which retransmission is to be performed, the wireless communication unit 110 may perform beamforming on a multicast frame. Alternatively, when there is a single wireless terminal 200 to which retransmission is to be performed, the wireless communication unit 110 may perform beamforming on a unicast frame. When there is a single wireless terminal to which retransmission is to be performed, then if the wireless communication unit 110 uses a unicast frame, a wireless terminal 200 to which retransmission is not to be performed can avoid transmitting an ACK frame.

(2) Storage Unit 120

The storage unit 120 is a part which records and retrieves data to and from a predetermined recording medium. The storage unit 120 is implemented as, for example, a hard disc drive (HDD). Needless to say, the recording medium may be various recording media, such as a solid-state memory, such as a flash memory or the like, a memory card including a solid-slate memory, an optical disc, a magneto-optical disc, a hologram memory, and the like. The storage unit 120 may be configured to be capable of recording and retrieval suitable for a recording medium which is employed.

For example, according to this embodiment, the storage unit 120 stores identification information of a wireless terminal 200 which has transmitted back an ACK frame corresponding to multicast transmission. As a result, the base station 100 can manage information of a wireless terminal 200 which has transmitted an ACK frame back, and therefore, avoid unnecessary retransmission. Also, the storage unit 120 may store default transmission settings. The transmission settings stored in the storage unit 120 may include, for example, a frequency channel which is used, timings, the number of times of retransmission, and the like.

(3) Control Unit 130

The control unit 130 functions as a computation device and a control device to control general operations in the base station 100 according to various programs. The control unit 130 is implemented by an electronic circuit such as, for example, a central processing unit (CPU), microprocessor, or the like. Note that the control unit 130 may include a read only memory (ROM) for storing a program, computation parameters, and the like which are used, and a random access memory for temporarily storing parameters or the like which are changed as appropriate. As shown in FIG. 2, the control unit 130 functions as a communication control unit 131, a setting unit 133, a retransmission method determination unit 135, and a retransmission timing determination unit 137.

(3-1) Communication Control Unit 131

The communication control unit 131 has the function of controlling transmission and reception processes which are performed by the wireless communication unit 110. For example, the communication control unit 131 controls multicast transmission which is performed by the wireless communication unit 110. Also, the communication control unit 131 controls a retransmission process which is performed by the wireless communication unit 110.

The communication control unit 131 performs threshold determination on an index, related to an ACK frame corresponding to multicast transmission, to determine whether or not it is necessary to perform a frame retransmission process. This threshold is set by the setting unit 133 described below. Various indexes related to an ACK frame corresponding to multicast transmission are conceived of.

For example the index related in an ACK frame corresponding to multicast transmission may be the number of wireless terminals 200 which have transmitted back an ACK frame corresponding to multicast transmission. In this case, if the number of wireless terminals 200 which have succeeded in reception and have transmitted an ACK frame has not reached the set threshold, the communication control unit 131 determines that a frame which has been multicast-transmitted is to be retransmitted. Also, if the number of wireless terminals 200 which have succeeded in reception and have transmitted an ACK frame has reached the set threshold, the communication control unit 131 determines that a frame which has been multicast-transmitted is not to be retransmitted. Note that the communication control unit 131 may perform threshold determination directly on the number of wireless terminals 200 which have transmitted back an ACK frame corresponding to multicast transmission, or may perform threshold determination on a numerical value obtained by subjecting that number to processing such as increasing or decreasing or the like.

Alternatively, for example, the index related to an ACK frame corresponding to multicast transmission may be the proportion of wireless terminals 200 which has transmitted back an ACK frame corresponding to multicast transmission to wireless terminals 200 which are a destination of multicast transmission. In this case, if the ratio of the number of wireless terminals 200 belonging to a multicast group to the number of wireless terminals 200 which have succeeded in reception and are a transmission source of an ACK frame, has not reached a threshold which is set, the communication control unit 131 determines that a frame which has been multicast-transmitted is to be retransmitted. Also, if the ratio of the number of wireless terminals 200 belonging to a multicast group to the number of wireless terminals 200 which have succeeded in reception and are a transmission source of an ACK frame, has reached the threshold which is set, the communication control unit 131 determines that a frame which has been multicast-transmitted is not to be retransmitted. Note that the communication control unit 131 may perform threshold determination directly on the proportion of wireless terminals 200 which have transmitted back an ACK frame corresponding to multicast transmission to wireless terminals 200 which are a destination of multicast transmission, or may perform threshold determination on the proportion subjected to processing such as increasing or decreasing or the like.

(3-2) Setting Unit 133

The setting unit 133 has the function of setting a threshold for determining whether or not it is necessary for the wireless communication unit 110 to perform a retransmission process, on the basis of information about reception of an ACK frame corresponding to multicast transmission from a wireless terminal 200.

As described above, the setting unit 133 sets a threshold related to the index related to an ACK frame corresponding to multicast transmission. For example, the setting unit 133 may set a threshold related to the number of wireless terminals 200 which have transmitted back an ACK frame corresponding to multicast transmission. In this case, the setting unit 133 may set a threshold according to the number of wireless terminals 200 to which multicast transmission is to be performed. Also, the setting unit 133 may set a threshold related to the proportion of wireless terminals 200 which has transmitted back an ACK frame corresponding to multicast transmission to wireless terminals 200 which are a destination of multicast transmission.

The setting unit 133 may set a threshold which is less than the total number of wireless terminals 200 belonging to a multicast group. For example, when 10 wireless terminals 200 belong to a multicast group, the setting unit 133 may set 5 terminals or a proportion of 0.5 as the threshold. In this case, when 5 of the 10 wireless terminals have transmitted an ACK frame back, the threshold is reached, and therefore, the communication control unit 131 assumes that multicast transmission has been successful, and does not perform retransmission. Thus, when the setting unit 133 sets such a threshold that retransmission will not be performed even when a portion of the wireless terminals 200 belonging to a multicast group have not transmitted an ACK frame back, whereby a waste of wireless resources can be avoided, and the system throughput can be improved.

Various kinds of information about reception of an ACK frame, which are a criterion on the basis of which the setting unit 133 sets the threshold, are conceived of. For example, the information about reception of an ACK frame may be information indicating the level of importance of a multicast frame for which the reception of an ACK frame has resulted in failure. The setting unit 133 may calculate the above importance level on the basis of information about a multicast frame for which the reception of an ACK frame has resulted in failure. An example of the importance level calculation will now be described.

(Calculation of Importance Level on Basis of Index of Upper Layer)

For example, the setting unit 133 calculates the importance level on the basis of an index of an upper layer related to data contained in a multicast frame for which the reception of a corresponding ACK frame has resulted in failure. Various indexes of an upper layer which are a reference for calculation of the importance level are conceived of. A specific example of an index of an upper layer which is a reference for calculation of the importance level will now be described.

Hierarchy of Encoding

For example, an index of an upper layer may be information indicating the encoding hierarchical level of data encoded by a hierarchical encoding technique. During encoding, data may be generated at a plurality of different hierarchical levels. In this case, the setting unit 133 calculates the importance level according to a hierarchical level to which data containing a frame belongs. An example of the hierarchical encoding technique is a hierarchical encoding technique used in the Moving Picture Experts Group (MPEG). When a media stream is encoded using this encoding technique, data in the base layer and data in the enhancement layer are generated. The base layer is a data stream necessary to decode a media stream. The enhancement layer is an accompanying data stream for improving the quality of a stream in the base layer Wireless terminals 200 cannot decode a media stream when it has failed to receive data in the base layer, and can decode a media stream even when it has failed to receive data in the enhancement layer. This is because the enhancement layer is a layer which is provided in order to improve the quality. Therefore, for example, the setting unit 133 may calculate that the importance level is high for a frame containing data in the base layer, and calculate that the importance level is low for a frame containing data in the enhancement layer.

Whether or not Video or Audio is Contained

For example, an index of an upper layer may be information indicating whether or not data contains at least any one of video and audio. For example, the setting unit 133 may calculate that the importance level is high for a frame containing video data or audio data, and calculate that the importance level is low for a frame containing neither video data nor audio data. Note that the value of the importance level may vary depending on the required system or application or the like. For example, in a moving image streaming service having high real-time performance, a case is conceived of where video data has a higher importance level than that of audio data. Therefore, for example, the setting unit 133 may calculate that the importance level is high for a frame containing video data, and calculate that the importance level is low for a frame containing audio data. Alternatively, for example, for data which does not require real-time performance, such as content distribution from a server or the like, the setting unit 133 may calculate that the importance level is high for a frame containing audio data, and calculate that the importance level is low for a frame containing video data.

Dependence Relationship with Other Data

For example, an index of an upper layer may be information indicating a dependence relationship between data and other data contained in a frame. A dependence relationship may exist between pieces of data. In this case, the setting unit 133 may calculate the importance level of data contained in a frame according to the dependence relationship between that data and other data. For example, for video data, there are types of data, i.e., I-pictures, P-pictures, and B-pictures. I-pictures, P-pictures, and B-pictures are used in a technique of compressing a moving image picture by predicting a current moving image picture from information of another moving image picture, I-pictures are a picture which is encoded without using prediction between pictures. An I-picture contains information of a picture itself, and therefore, does not have a dependence relationship with another picture. P-pictures are a picture which is encoded using only the previous picture as prediction information. A P-picture depends on an I-picture, because difference information from the I-picture is encoded. B-pictures are a picture which is encoded using the previous and next pictures as prediction information A B-picture depends on an I-picture, because difference information from the I-picture is encoded. Thus, an I-picture is essential for decoding of a B picture and a P-picture with reference to the I-picture, and therefore, has a different importance level of data from those of the B-picture and the P-picture. Therefore, for example, the setting unit 133 may calculate that the importance level is high for a frame containing data of an I-picture, and calculate that the importance level is low for a frame containing data of a P-picture or a B-picture.

Whether or not Protocol Header of Upper Layer is Contained

For example, an index of an upper layer may be information indicating whether or not data contained in a frame contains a protocol header of an upper layer. The boundary between data frames, which are a unit of wireless transmission, does not necessarily coincide with the boundary between packets of an upper-layer protocol (e.g., the Transmission Control Protocol (TCP) or the User Datagram Protocol (UDP), etc.). Therefore, data frames which contain a header portion of an upper-layer protocol and data frames which do not contain it may coexist. A header portion of a protocol contains important information for correctly deciphering data. Therefore, if a wireless terminal 200 has failed to receive a header portion of a protocol, then even when the reception of the other portion corresponding to data has resulted in success, it is difficult to correctly decipher the data. Therefore, for example, the setting unit 133 may calculate that the importance level is high for a frame containing a protocol header of an upper layer such as TCP, UDP, or the like, and calculate that the importance level is low for the other frames.

Whether or not Time Stamp is Contained

For example, an index of an upper layer may be information indicating whether or not data contains a lime stamp. For example, it is conceived that the base station 100, when transmitting video data or audio data, uses the MPEG system layer. A MPEG time stamp contained in the MPEG layer is used to synchronize different contents, such as audio, video, and the like, with each other. Therefore, when a wireless terminal 200 has failed to receive an MPEG time stamp, a situation may occur in which contents which are desired to be output simultaneously as the behavior of an application are output at different timings. For example, a situation may occur in which timings of a moving image at which an actor or actress in a film is speaking, may not be synchronous with timings at which lines which are spoken are heard. In addition, when a wireless terminal 200 has failed to receive an MPEG time stamp, a situation may occur in which video or audio is not smoothly played back. In such a situation, the occurrence of reception error is likely to be clearly noticed by the user. Therefore, it is desirable that such a situation should be avoided. Therefore, for example, the setting unit 133 may calculate that the importance level is high for a frame which contains a time stamp, and calculate that the importance level is low for a frame which does not contain a time stamp.

In the foregoing, an example of the importance level calculation based on an index of an upper layer has been described. Note that the setting unit 133 may acquire various indexes of upper layers from the corresponding upper layers using, for example, an interface called "primitive."

The setting unit 131 sets the threshold on the basis of the calculated importance level. For example, the setting unit 133 may set a high threshold for a frame having a high importance level. In this case, for a frame having a high importance level, the communication control unit 131 repeatedly performs retransmission until many wireless terminals 200 have transmitted an ACK frame back. Meanwhile, the setting unit 133 may set a low threshold for a frame having a low importance level. In this case, for a frame having a low importance level, the communication control unit 131 will not perform retransmission, even when only a few wireless terminals 200 have transmitted an ACK frame back. As a result, the communication control unit 131 can perform the retransmission process according to the importance level of a frame, i.e., can give priority to reliable reception for a frame having a high importance level, and can give priority to improvement of the system throughput for a frame having a low importance level.

(Supplements)

The setting unit 133 may calculate the importance level by combining a plurality of indexes of an upper layer. Also, the setting unit 133 may set two or more importance levels. Also, the importance level may have a continuous value or a discrete value.

Also, as the information about reception of an ACK frame corresponding to multicast transmission from a wireless terminal 200, the setting unit 133 may set the threshold on the basis of the number of wireless terminals 200 belonging to a multicast group. For example, the setting unit 133 may set a higher threshold as the number of wireless terminals 200 belonging to a multicast group increases, and may set a lower threshold as the number of wireless terminals 200 belonging to a multicast group decreases.

Also, the setting unit 133 may dynamically calculate and set a threshold, or may set a fixed value stored in the storage unit 120. In either case, if the setting unit 133 sets such a threshold that the retransmission process will not be performed even when a portion of the wireless terminals 200 belonging to a multicast group have not transmitted an ACK frame back, a waste of wireless resources can be avoided.

(3-3) Retransmission Method Determination Unit 135

The retransmission method determination unit 135 has the function of determining a method of transmitting a retransmission frame in the retransmission process performed by the communication control unit 131. For example, the retransmission method determination unit 135 determines a transmission method on the basis of information about a wireless terminal 200 which has failed to receive an ACK frame corresponding to multicast transmission. Various transmission methods in the retransmission process are conceived of. A specific example of a transmission method in the retransmission process will now be described Beamforming For example, the retransmission method determination unit 135 may determine whether or not beamforming is to be performed. For example, the retransmission method determination unit 135 may determine that beamforming is to be performed if wireless terminals 200 to which retransmission is to be performed include one that has a high channel correlation, and may determine that transmission without directivity is to be performed if none of the wireless terminals 200 has a high channel correlation. Alternatively, the retransmission method determination unit 135 may determine that beamforming is to be performed if the number of wireless terminals 200 which have a high channel correlation, of wireless terminal 200 to which retransmission is to be performed, is sufficient to satisfy the threshold, and otherwise, may determine that transmission without directivity is to be performed.

Multicast Transmission/Unicast Transmission

For example, the retransmission method determination unit 135 may determine whether multicast transmission is to be performed or unicast transmission is to be performed. For example, the retransmission method determination unit 135 may determine that unicast transmission is to be performed if the number of wireless terminals 200 which are required so that the threshold is satisfied is one, and may determine that multicast transmission is to be performed if the number of wireless terminals 200 which are necessary to satisfy the threshold is plural.

Thus, the retransmission method determination unit 135 can determine an efficient transmission method for satisfying the threshold, on the basis of information about a wireless terminal 200 which has failed to receive an ACK frame corresponding to multicast transmission. As a result, the retransmission process is more efficiently performed, resulting in an improvement in the system throughput.

(3-4) Retransmission Timing Determination Unit 137

The retransmission liming determination unit 137 has the function of determining a timing at which the communication control unit 131 performs the retransmission process. For example, it is assumed that a default retransmission timing is a timing immediately after all frames that had already been scheduled to be transmitted when it was determined that retransmission is to be performed have been transmitted. The retransmission timing determination unit 137, when retransmitting a frame, changes the default retransmission timing by setting a waiting time until retransmission, depending on a situation.

For example, there may be interference from another system employing the same frequency band, such as radio wave interference from a microwave oven in the 2.4-GHz band of wireless LAN. Therefore, the retransmission timing determination unit 137 may check conditions of a frequency channel used for transmission, and when there is interference, may set a wailing time so that the retransmission timing is later than the default. At this time, the retransmission timing determination unit 137 may determine whether or not the retransmission timing is to be changed, or may adjust the length of the waiting time, depending on the strength of the interference. As a result, the wireless terminals 200 can be prevented from failing to receive a retransmission frame due to interference, resulting in a reduction in unnecessary retransmission.

Here, another process such as, for example, transmission of another frame or the like, may be performed during the waiting time until the retransmission timing. Note that, for successive frames, the retransmission timing determination unit 137 may stop transmission of frames following a frame to be retransmitted. Specifically, the retransmission timing determination unit 137 may determine that a retransmission process is to be performed before a frame that follows. As a result, a receiver can receive successive frames in that order, so that a reordering process will not be performed, and therefore, the process load can be reduced. Note that if a following frame had already been transmitted when it was determined that retransmission is to be performed, the retransmission timing determination unit 137 determines that a retransmission process is to be performed before a frame later than that frame.

Thus, the retransmission timing determination unit 137 can determine an appropriate retransmission timing. As a result, useless retransmission can be reduced, or the process load on the receiver can be reduced.

In the foregoing, a configuration example of the base station 100 according to this embodiment has been described. Next, an operation process example of the base station 100 according to this embodiment will be described with reference to FIG. 3 to FIG. 6.

[2-3. Operation Process Examples]
(Retransmission Process)

Figure 3:
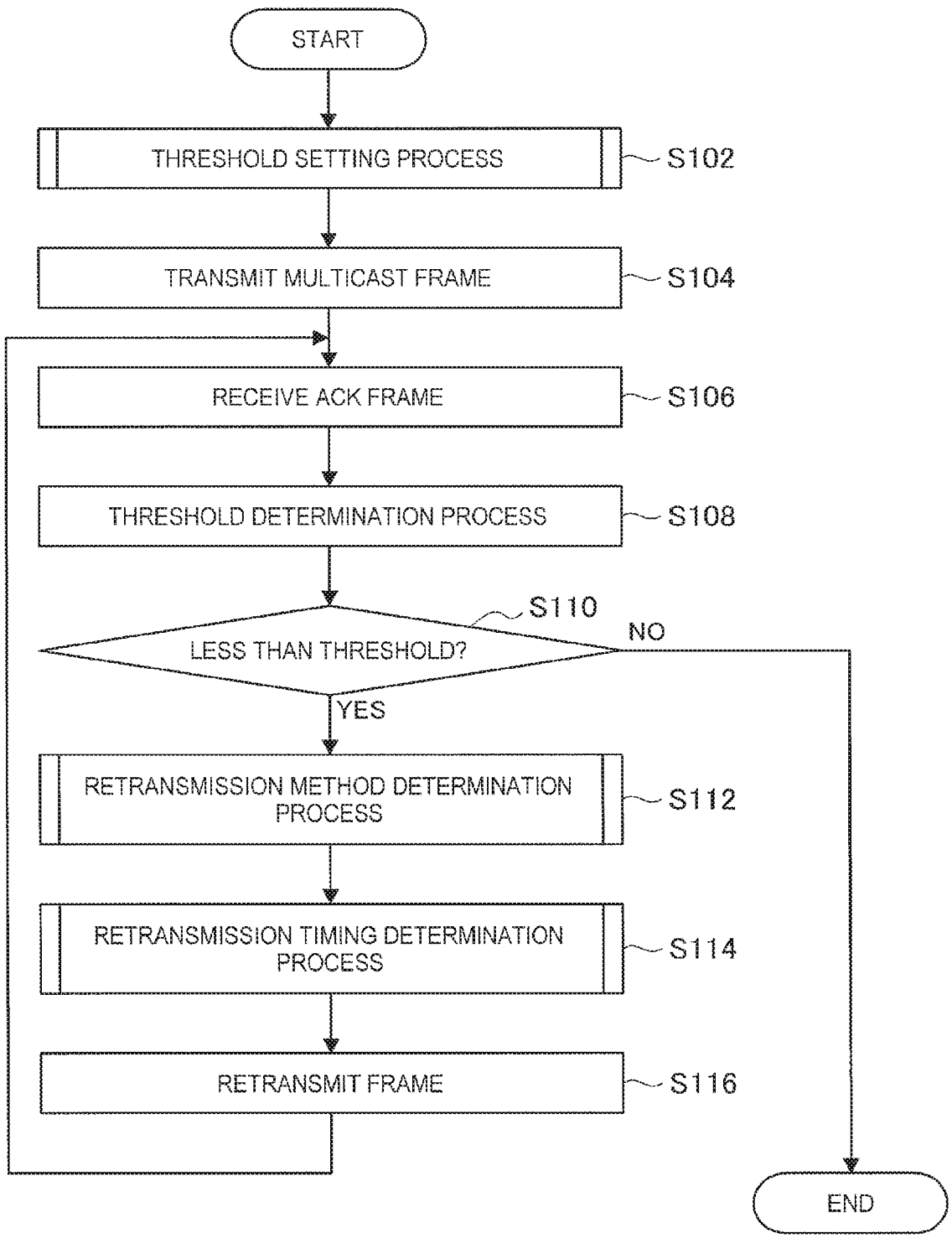
FIG. 3 is a flowchart showing a flow example of a retransmission process performed in a base station according to the first embodiment.

FIG. 3 is a flowchart showing a flow example of a retransmission process performed in the base station 100 according to this embodiment.

As shown in FIG. 3, initially, in step S102, the setting unit 133 performs a threshold setting process. This process will not now be described, because it will be described below with reference to FIG. 4.

Next, in step S104, the wireless communication unit 110 transmits a multicast frame.

Next, in step S106, the wireless communication unit 110 receives an ACK frame which is transmitted back from a wireless terminal 200 which has succeeded in receiving the multicast frame transmitted in step S104. At this time, the communication control unit 131 reads identification information of the wireless terminal 200, which is a transmission source, from the ACK frame received from the wireless terminal 200, and stores the identification information, as a terminal which has succeeded in receiving a multicast frame, in the storage unit 120. The communication control unit 131 performs a similar process each time retransmission is subsequently performed, and manages terminals of a multicast group which have succeeded in reception, and the other terminals which have failed. As the identification information of a wireless terminal 200, a MAC address may be used, for example.

Next, in step S108, the communication control unit 131 performs a threshold determination process. Specifically, the communication control unit 131 determines whether or not an index related to an ACK frame the reception of which has resulted in success in step S106 has reached the threshold set in step S102. For example, when the threshold is the number of terminals which have transmitted an ACK frame back, the communication control unit 131 determines whether or not the number of wireless terminals 200 which have transmitted back an ACK frame corresponding to multicast transmission is greater than or equal to the threshold. Also, when the threshold is the proportion of terminals which have transmitted an ACK frame back, the communication control unit 131 determines whether or not the proportion of wireless terminals 200 which have transmitted back the ACK frame corresponding to multicast transmission to the wireless terminals 200 which are a destination of multicast transmission is greater than or equal to the threshold.

If the threshold has not been reached (S110/YES), in step S112 the retransmission method determination unit 135 performs a retransmission method determination process. This process will not now be described, because it will be described below with reference to FIG. 5.

Next, in step S114, the retransmission timing determination unit 137 performs a retransmission timing determination process. This process will not now be described, because it will be described below with reference to FIG. 6.

Thereafter, in step S116, the wireless communication unit 110 retransmits the frame. Here, the wireless communication unit 110 may perform multicast transmission, may perform unicast transmission, may perform beamforming, or may perform transmission without directivity, depending on the process result in step S112. Also, the wireless communication unit 110 retransmits the frame at the retransmission timing indicated by the process result in step S114.

Thereafter, the process returns to step S106 again.

Meanwhile, if the result of the threshold determination process in step S108 is greater than or equal to the threshold (S110/NO), the process is ended. Thereafter, for example, step S102 and following steps are repeatedly performed for frames following the frame transmitted in slop S104.

In the foregoing, a flow example of the retransmission process according to this embodiment has been described. Next, the threshold setting process, the retransmission method determination process, and the retransmission timing determination process in the above retransmission process wilt be described with reference to FIG. 4 to FIG. 6.

(Threshold Setting Process)

Figure 4:
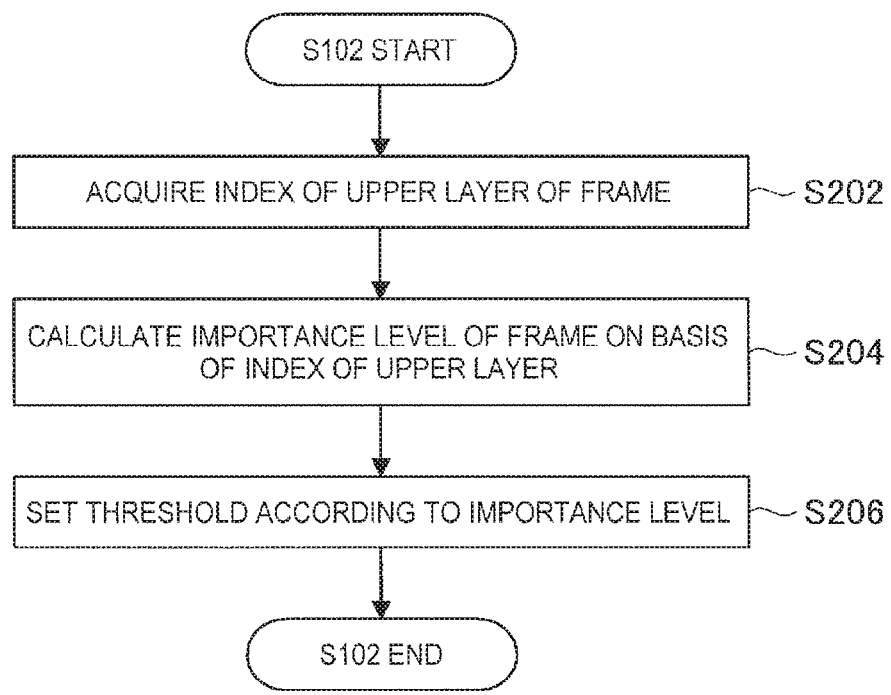
FIG. 4 is a flowchart showing a flow example of a threshold setting process performed in a base station according to the first embodiment.

FIG. 4 is a flowchart showing a flow example of the threshold setting process performed in the base station 100 according to this embodiment. This process corresponds to the process in step S102 of FIG. 3.

As shown in FIG. 4, initially, in step S202, the setting unit 133 acquires an index of an upper layer related to a frame. For example, the setting unit 133 acquires information indicating the hierarchy of encoding, whether or not video or audio is contained, the dependence relationship with other data, whether or not a protocol header of an upper layer is contained, whether or not a time stamp is contained, and the like. Note that the frame as used here refers to a multicast frame which is transmitted by the base station 100 in step S104 of FIG. 3. The same applies to the description that follows.

Next, in step S204, the setting unit 133 calculates the importance level of the frame on the basis of the index of the upper layer acquired in step S202. For example, the setting unit 133 calculates the importance level of the frame, taking into consideration all of the importance levels calculated on the plurality of indexes of an upper layer which have been acquired.

Thereafter, in step S206, the setting unit 133 sets the threshold according to the importance level calculated in step S204. For example, the setting unit 133 sets a higher threshold as the importance level increases, and a lower threshold as the importance level decreases. Note that the threshold as used here may be set as, for example, the number of terminals which have transmitted an ACK frame back, or may be set as the proportion of terminals which have transmitted an ACK frame back.

In the foregoing, a flow example of the threshold setting process according to this embodiment has been described.

(Retransmission Method Determination Process)

Figure 5:
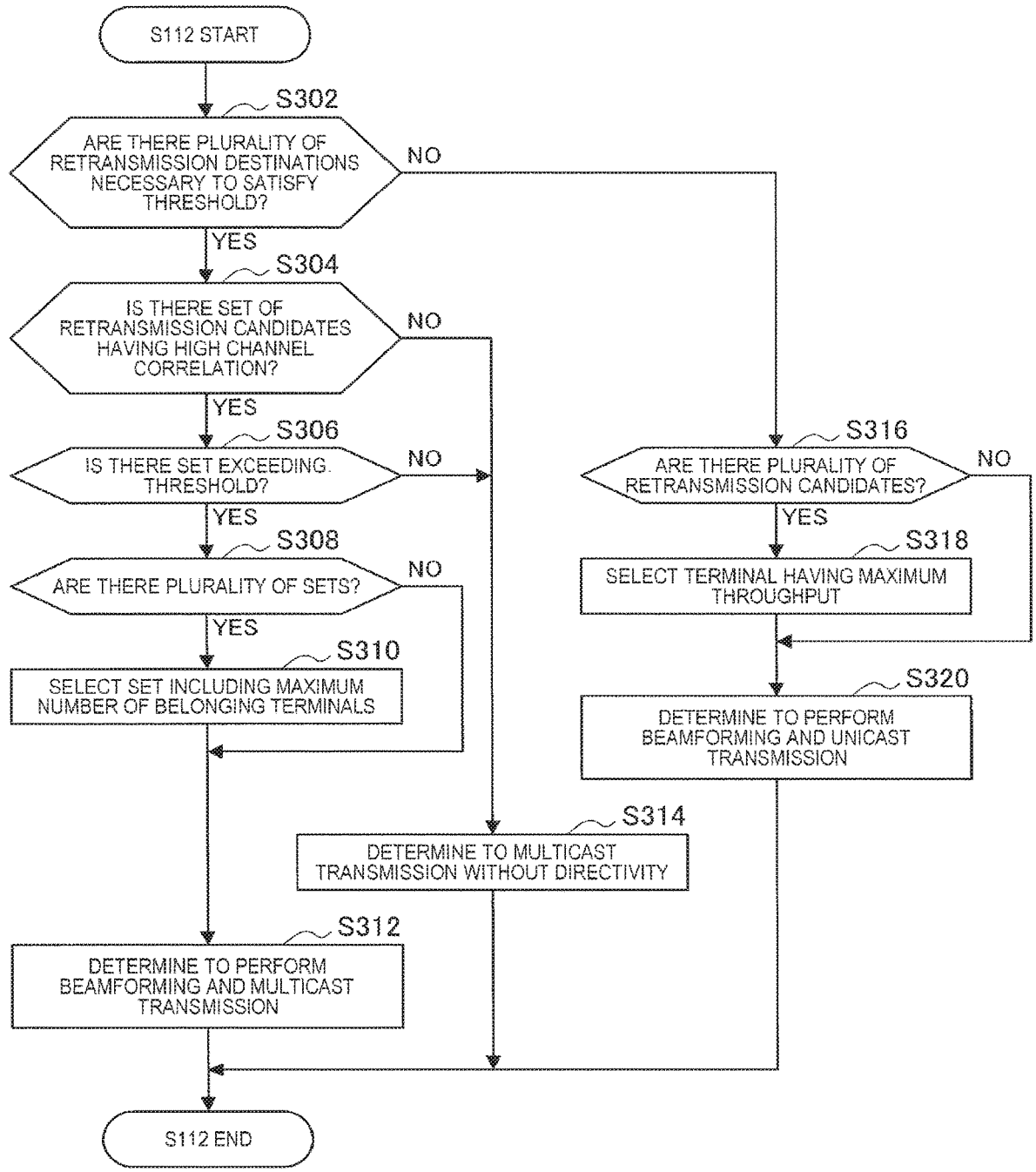
FIG. 5 is a flowchart showing a flow example of a retransmission method determination process performed in a base station according to the first embodiment.

FIG. 5 is a flowchart showing a flow example of the retransmission method determination process performed in the base station 100 according to this embodiment. This process corresponds to the process in step S112 of FIG. 3.

As shown in FIG. 5, initially, in step S302, the retransmission method determination unit 115 determines whether or not there are a plurality of wireless terminals 200 which are retransmission destinations necessary to satisfy the threshold. For example, the number of wireless terminals 200 necessary to satisfy the threshold is represented by α. In this case, if α wireless terminals 200 have transmitted an ACK frame back after retransmission of the frame, the threshold is satisfied.

If α>1 (S302/YES), in step S304 the retransmission method determination unit 135 determines whether or not there is a set of retransmission candidates having a high channel correlation. Specifically, the retransmission method determination unit 135 determines whether or not there is a set of wireless terminals 200 having a high channel correlation, of wireless terminals 200 which have not transmitted an ACK frame back.

If there is not a set of retransmissions having a high channel correlation (S304/NO), in step S314 the retransmission method determination unit 135 determines that multicast transmission is to be performed without directivity (without beamforming).

Meanwhile, if there is a set of retransmissions having a high channel correlation (S304/YES), in step S306 the retransmission method determination unit 135 determines whether or not there is a set exceeding the threshold. Specifically, the retransmission method determination unit 135 determines whether or not there is a set of a or more wireless terminals 200, of the sets of wireless terminals 200 which have not transmitted an ACK frame back and have a high channel correlation.

If it is determined that there is not a set exceeding the threshold (S306/NO), in step S314 the retransmission method determination unit 135 determines that multicast transmission is lobe performed without directivity.

If it is determined that there is a set exceeding the threshold (S306/YES), in step S308 the retransmission method determination unit 135 determines whether or not there are a plurality of sets exceeding the threshold.

If it is determined that there are a plurality of sets exceeding the threshold (S308/YES), in S310 the retransmission method determination unit 135 selects a set including the largest number of wireless terminals 200, of the sets exceeding the threshold. This selection criterion is merely an example, and the present technology is not limited to this example. For example, the retransmission method determination unit 135 may select a set including the smallest number of wireless terminals 200, or may select a set having the highest channel correlation, or may select a set allowing transmission at the highest throughput. Thereafter, in step S312, the retransmission method determination unit 135 determines that beamforming is to be performed and multicast transmission is to be performed. At this time, the retransmission method determination unit 135 determines that beamforming is to be performed with respect to the set selected in step S310.

Meanwhile, if it is determined that there is a single set exceeding the threshold (S308/NO), in step S312 the retransmission method determination unit 135 determines that beamforming is to be performed with respect to the set, and multicast transmission is to be performed.

Meanwhile, if it is determined in step S302 that there is a single wireless terminal 200 which is a retransmission destination necessary to satisfy the threshold, i.e., it is determined that α=1 (S302/NO), the process proceeds to step S316. In step S316, the retransmission method determination unit 135 determines whether or not there are a plurality of retransmission candidates. Specifically, the retransmission method determination unit 135 determines whether or not there are a plurality of wireless terminals 200 which have not transmitted an ACK frame back.

If it is determined that there are a plurality of retransmission candidates (S316/YES), in step S318 the retransmission method determination unit 135 select, a wireless terminal 200 having the highest throughput, of the retransmission candidates. Note that this selection criterion is merely an example, and the present technology is not limited to this. For example, the retransmission method determination unit 135 may randomly select a single wireless terminal 200. Thereafter, in step S320, the retransmission method determination unit 135 determines that beamforming is to be performed and unicast transmission is to be performed with respect to the selected wireless terminal 200.

Meanwhile, if it is determined that there is a single retransmission candidate (S316/NO), in step S320 the retransmission method determination unit 135 determines that beamforming is to be performed and unicast transmission is to be performed with respect to the wireless terminal 200 which is a retransmission candidate.

According to the result of the above-described retransmission method determination process, the wireless communication unit 110 performs the retransmission process. For example, when there are a plurality of wireless terminals 200 which are retransmission destinations necessary to satisfy the threshold, the wireless communication unit 110 performs multicast transmission. Also, the wireless communication unit 110 performs beamforming if there is a set of retransmission candidates having a high channel correlation, and performs transmission without beamforming if there is not a set of retransmission candidates having a high channel correlation. Also, when there is a single wireless terminal 200 which is a retransmission destination necessary to satisfy the threshold, the wireless communication unit 110 performs beamforming and unicast transmission.

In the foregoing, a flow example of the retransmission method determination process according to this embodiment has been described.

(Retransmission Timing Determination Process)

Figure 6:
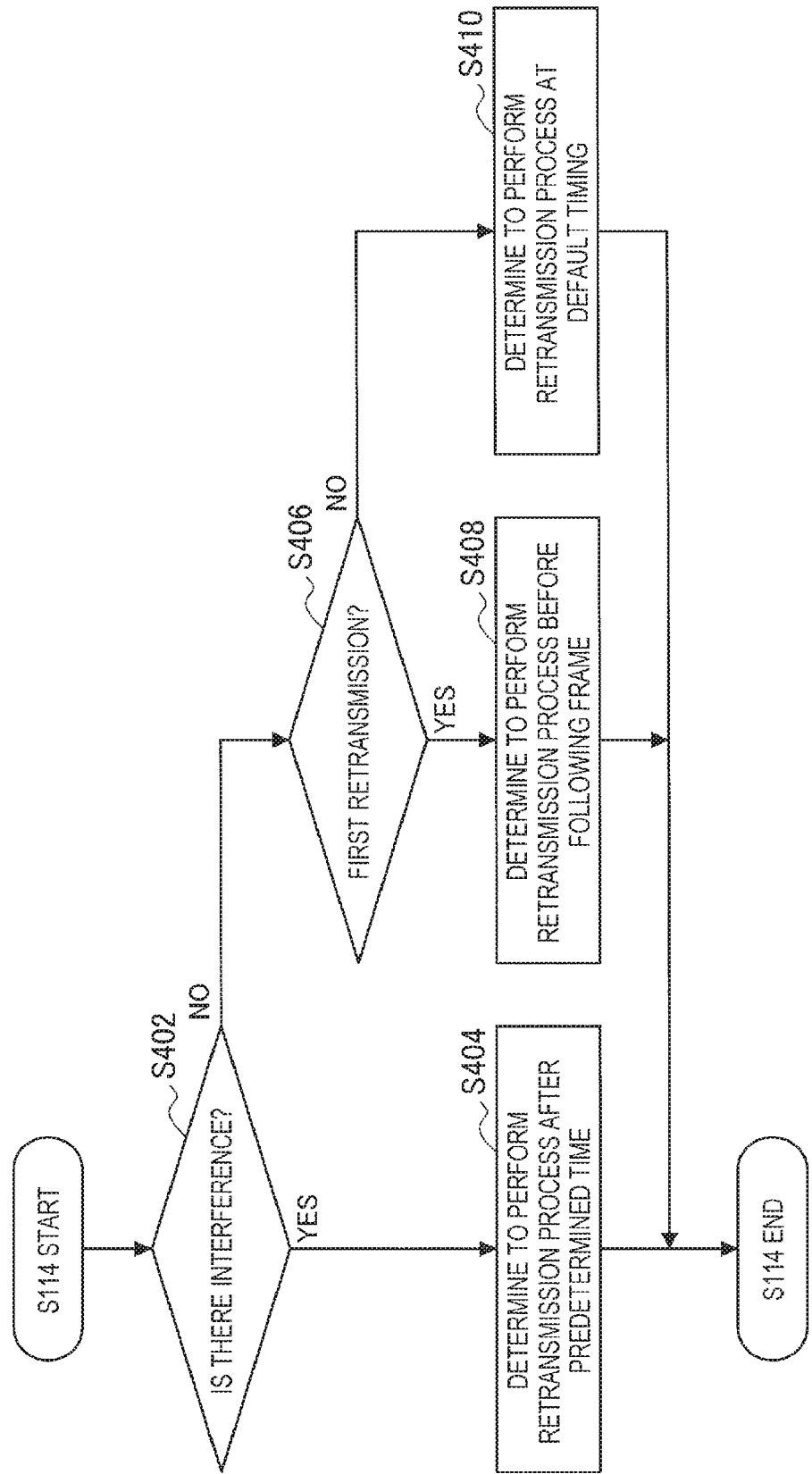
FIG. 6 is a flowchart showing a flow example of a retransmission timing determination process performed in a base station according to the first embodiment.

FIG. 6 is a flowchart showing a flow example of the retransmission timing determination process performed in the base station 100 according to this embodiment. This process corresponds to the process in step S114 of FIG. 3.

As shown in FIG. 6, initially, in step S402, the retransmission timing determination unit 137 determines whether or not there is interference. For example, the retransmission timing determination unit 137 checks conditions of a frequency channel used for transmission, to determine whether or not there is interference from another system employing the same similar frequency band, such as radio wave interference from a microwave oven in the 2.4-GHz band of wireless LAN.

If it is determined that there is interference (S402/YES), in step S404 the retransmission timing determination unit 137 determines that a retransmission process is to be performed after waiting for a predetermined period of time. Note that the retransmission timing determination unit 137 may adjust the length of the waiting time until retransmission is performed, depending on the strength of the interference.

Meanwhile, if it is determined that there is not interference (S402/NO), in step S406 the retransmission timing determination unit 137 determines whether or not the retransmission is the first retransmission. For example, when a frame is to be retransmitted for the first time, the retransmission timing determination unit 137 determines that the retransmission is the first retransmission. When a frame which has already been retransmitted is to be retransmitted again, the retransmission timing determination unit 137 determines that the retransmission is the second retransmission or following.

If it is determined that the retransmission is the first retransmission (S406/YES), in step S408 the retransmission liming determination unit 137 determines that a retransmission process is to be performed before the following frame. As a result, it is possible that the receiver will not perform the process of reordering, and the process load can be reduced.

Meanwhile, if it is determined that the retransmission is the second retransmission or following (S406/NO), in step S410 the retransmission timing determination unit 137 determines that a retransmission process is to be performed at a default timing. For example, the retransmission timing determination unit 137 determines that a frame to be retransmitted is to be transmitted after all frames scheduled to be transmitted have already been transmitted.

In the foregoing, a flow example of the retransmission timing determination process according to this embodiment has been described.

[2-4. Variation 1]

This variation is an embodiment in which the threshold is set on the basis of a transmission setting. A base station 100 according to this variation has a configuration similar to that which has been described above with reference to FIG. 2. A characteristic configuration of this variation will now be described.

(Calculation of Importance Level on Basis of Transmission Setting)

A setting unit 133 according to this variation calculates the importance level on the basis of a transmission setting which has been used during transmission of a multicast frame. Various transmission settings which are criteria for calculation of the importance level are conceived of. Specific examples of a transmission setting which is a criterion for calculation of the importance level, will now be described.

Settings for Transmission in Bundle of Plurality of Frequency Channels

For example, a transmission seating which is a criterion for calculation of the importance level may be a setting for transmission in a bundle of a plurality of frequency channels. This setting is also called, for example, channel bonding. In the base station 100, the throughput can be improved by using channel bonding. For example, the setting unit 133 may calculate that the importance level is high for a frame transmitted using channel bonding, and calculate that the importance level is low for a frame transmitted without using channel bonding.

Frequency Channel

For example, a transmission setting which is a criterion for calculation of the importance level may be a setting for a frequency channel. The throughput may vary from fluency channel to frequency channel. In this case, for example, the base station 100 may transmit more important data using a frequency channel having a higher throughput. Therefore, for example, the setting unit 133 may calculate that the importance level is high for a frame transmitted using a frequency channel having a high throughput, and calculate that the importance level is low for a frame transmitted using a frequency channel having a low throughput.

In the foregoing, an example of calculation of the importance level on the basis of a transmission setting, has been described. Note that the setting unit 133 may calculate the importance level using a combination of a plurality of transmission settings, or calculate the importance level additionally using the plurality of indexes of an upper layer according to the first embodiment. The setting unit 133 sets the threshold on the basis of the calculated importance level of a multicast frame.

In the foregoing, a characteristic configuration of the setting unit 133 according to this variation has been described. Next, an operation process example of the base station 100 according to this variation will be described. An operation process of the base station 100 according to this variation is similar to that of the first embodiment, except for the threshold setting process. Therefore, a threshold setting process according to this variation will be described with reference to FIG. 7.

(Threshold Setting Process)

Figure 7:
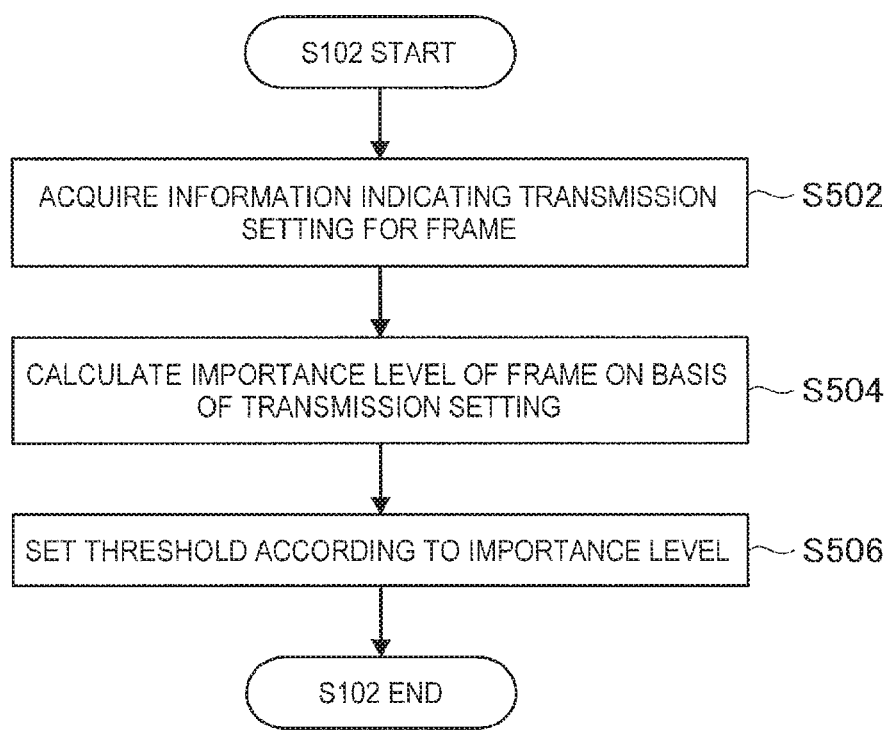
FIG. 7 is a flowchart showing a flow example of a threshold setting process performed in a base station according to Variation 1.

FIG. 7 is a flowchart showing a flow example of the threshold setting process perforated in the base station 100 according to this variation. This process corresponds to the process in step S102 of FIG. 3.

As shown in FIG. 7, initially, in step S502, the setting unit 133 acquires information indicating a transmission setting for a frame. For example, the setting unit 133 acquires information indicating a setting for channel bonding and a setting for a frequency channel. Note that the frame as used here refers to a multicast frame which is transmitted by the base station 100 in step S104 of FIG. 3. The same applies to the description that follows.

Next, in step S504, the setting unit 133 calculates the importance level of the frame on the basis of the information indicating the transmission settings which have been acquired in step S502. For example, the setting unit 133 calculates the importance level of the frame, taking into consideration all of the importance levels calculated on the information indicating the transmission settings which have been acquired.

Thereafter, in step S506, the setting unit 133 sets the threshold according to the importance level calculated in step S504. For example, the setting unit 133 sets a higher threshold as the importance level increases, and sets a lower threshold as the importance level decreases. Note that, here, for example, the threshold may be set as the number of terminals which have transmitted an ACK frame back, or may be set as the proportion of terminals which have transmitted an ACK frame back.

In the foregoing, a flow example of the threshold setting process according to this variation has been described.

[2-5 Variation 2]

This variation is an embodiment in which the threshold is set on the basis of information about an MAC layer. The base station 100 according to this variation has a configuration similar to that which has been described above with reference to FIG. 2. A characteristic configuration of this variation will now be described.

(Calculation of Importance Level on Basis of Information about MAC Layer)

A setting unit 133 according to this variation calculates the importance level on the basis of information about a media access control (MAC) layer of a multicast frame. Various kinds of information about an MAC layer which is a criterion for calculation of the importance level are conceived of. A specific example of information about an MAC layer which is a criterion for calculation of the importance level will now be described.

Type of Multicast Frame

For example, the information about an MAC layer which is a criterion for calculation of the importance level may be the type of a multicast frame. For example, the setting unit 133 may calculate the importance level on the basis of the type of a frame based on an access category compliant with the IEEE802.11 standard. In IEEE802.11, data frames are divided into four categories (AC_VO, AC_VI, AC_BE, and AC_BK) so that the transmission opportunity, continuous transmission allowable time, and the like of data are differentiated according to quality required by an application. For example, the priority of AC_VO may be ranked first, the priority of AC_VI may be ranked second, the priority of AC_BE may be ranked third, and the priority of AC_BK may be ranked fourth. Therefore, for example, the setting unit 133 may calculate that the importance level is highest for a frame of AC_VO, calculate that the importance level is second highest for AC_VI, calculate that the importance level is third highest for AC_BE, and calculate that the importance level is fourth highest for AC_BK.

Data Amount of Multicast Frame

For example, the information about an MAC layer which is a criterion for calculation of the importance level may be information indicating the data amount of a multicast frame. For example, the setting unit 133 may calculate that the importance level is higher as the data amount of a frame increases, and calculate that the importance level is lower as the data amount decreases.

In the foregoing, an example of calculation of the importance level on the basis of the information about an MAC layer has been described. Note that the setting unit 133 may calculate the importance level using a combination of information about a plurality of MAC layers, or calculate the importance level additionally using a combination of a plurality of indexes of an upper layer according to the first embodiment and/or a transmission setting according to Variation 1. The setting unit 133 sets the threshold on the basis of the calculated importance level of a multicast frame.

In the foregoing, a characteristic configuration of the setting unit 133 according to this variation has been described. Next an operation process example of the base station 100 according to this variation will be described. The operation process of the base station 100 according to this variation is similar to that of the first embodiment, except for the threshold setting process. Therefore, a threshold setting process according to this variation will be described with reference to FIG. 8.

(Threshold Setting Process)

Figure 8:
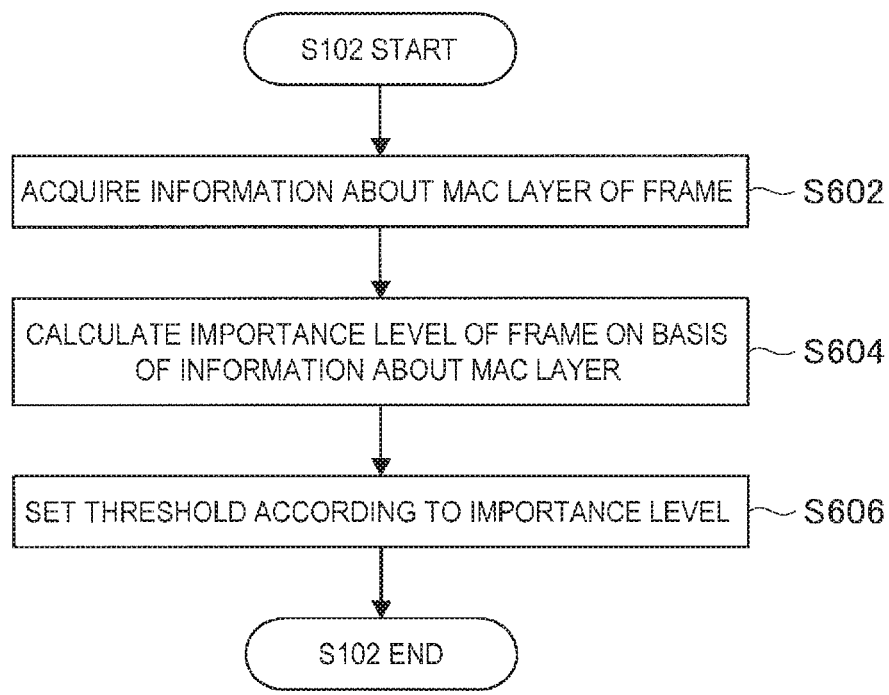
FIG. 8 is a flowchart showing a How example of a threshold setting process performed in abase station according to Variation 2.

FIG. 8 is a flowchart showing a flow example of the threshold setting process performed by the base station 100 according to this variation. This process corresponds to the process in step S102 of FIG. 3.

As shown in FIG. 8, initially, in step S602, the setting unit 133 acquires information about an MAC layer. For example, the setting unit 133 acquires information indicating the type of a frame and the data amount of the frame. Note that the frame as used here refers to a multicast frame which is transmitted by the base station 100 in step S104 of FIG. 3. The same applies to the description that follows.

Next, in step S604, the setting unit 133 calculates the importance level of the frame on the basis of the information about an MAC layer acquired in step S602. For example, the setting unit 133 calculates die importance level of the frame, taking into consideration each importance level calculated on the basis of the acquired information about an MAC layer.

Thereafter, in step S606, the setting unit 133 sets the threshold according to the importance level calculated in step S604. For example, the setting unit 133 set a higher threshold as the importance level increases, and sets a lower threshold as the importance level decreases. Note that, here, for example, the threshold may be set as the number of terminals which have transmitted an ACK frame back, or may be set as the proportion of terminals which have transmitted an ACK frame back.

In the foregoing, a flow example of the threshold setting process according to this variation has been described.

3. Second Embodiment

This embodiment is one in which by performing threshold determination on the number of times of retransmission of a frame, it is determined whether or not retransmission is to be performed. A base station 100 according to this embodiment has a configuration similar to dial which has been described above with reference to FIG. 2. A characteristic configuration of this embodiment will now be described

[3-1. Configuration Examples of Base Station]

(Communication Control Unit 131)

The communication control unit 131 according to this embodiment determines whether or not it is necessary to perform a frame retransmission process by performing threshold determination on an index about the number of times of retransmission of a frame which has been multicast-transmitted. This threshold (the maximum number of times of retransmission) is set by the setting unit 133. For example, if the number of times of retransmission of a frame has not reached the set threshold, the communication control unit 131 determines that the frame is to be retransmitted. Also, if the number of times of retransmission of a frame has reached the set threshold, the communication control unit 131 determines that the frame is not to be retransmitted. Note that the communication control unit 131 may perform threshold determination directly on the number of times of retransmission, or perform threshold determination on a numerical value obtained by subjecting that number to processing such as increasing or decreasing or the like.

(Setting Unit 133)

The setting unit 133 has the function of setting a threshold for the number of times of retransmission which is for determining whether or not it is necessary for the wireless communication unit 110 to perform a retransmission process. For example, the setting unit 133 may calculate the importance level of a multicast frame using the criterion described above in the first embodiment, and set the maximum number of times of retransmission according to the calculated importance level. For example, the setting unit 133 may set a high maximum number of times of retransmission for a frame having a high importance level. In this case, the communication control unit 131 can retransmit a frame having a high importance level a larger number of times. Meanwhile, the setting unit 133 may set a low maximum number of times of retransmission for a frame having a low importance level. In this case, the communication control unit 131 can end retransmission after a smaller number of times for a frame having a low importance level. As a result, the communication control unit 131 can perform a retransmission process according to the importance level of a frame, i.e., can give priority to reliable reception for a frame having a high importance level, and can give priority to improvement of the system throughput for a frame having a low importance level.

In the foregoing, a characteristic configuration of the base station 100 according to this embodiment has been described. Next, an operation process example of the base station 100 according to this embodiment will be described with reference to FIG. 9.

[3-2. Operation Process Example]

Figure 9:
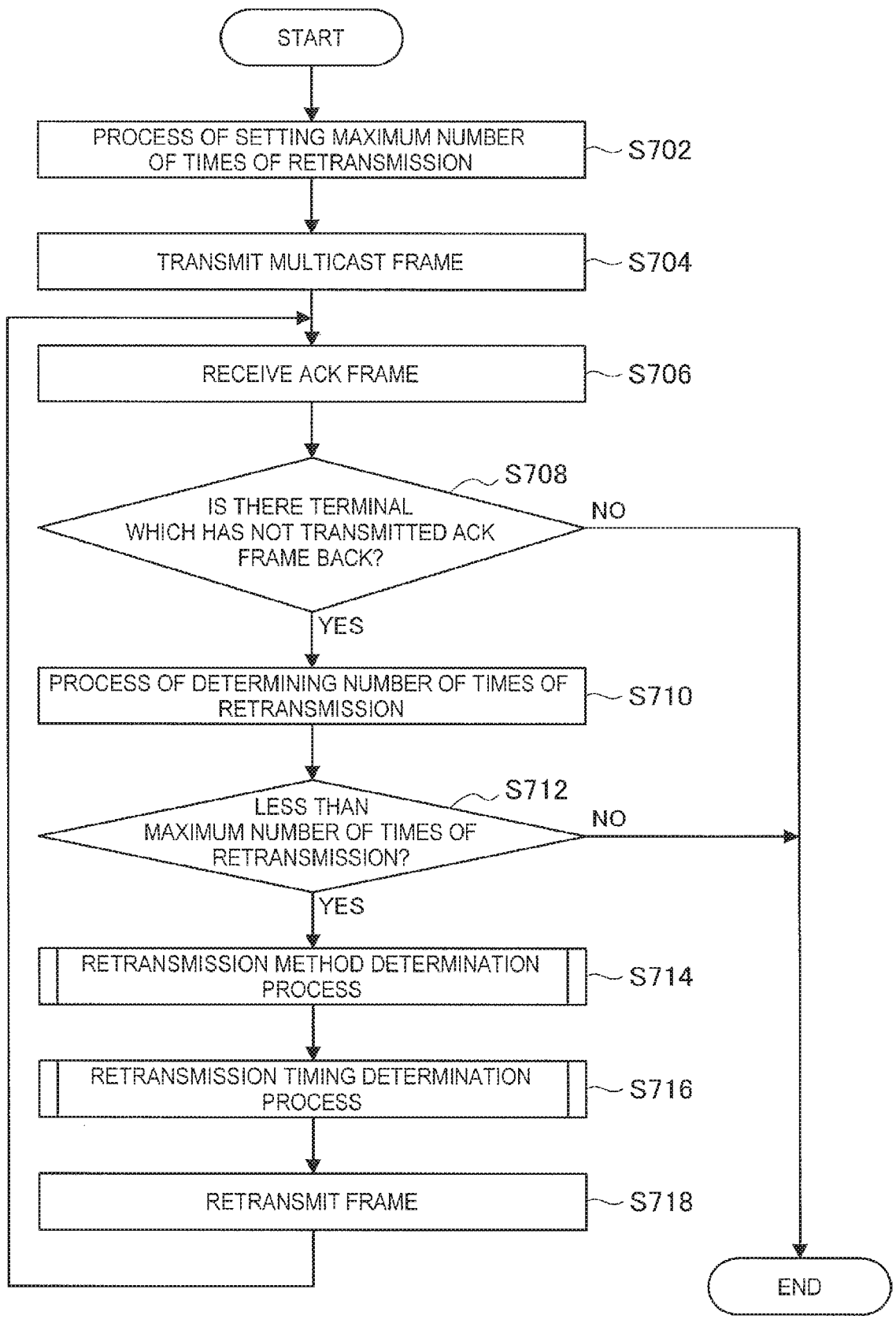
FIG. 9 is a flowchart showing a flow example of a retransmission process performed in a base station according to a second embodiment.

FIG. 9 is a flowchart showing a flow example of a retransmission process performed in the base station 100 according to this embodiment.

As shown in FIG. 9, initially, in step S702, the setting unit 133 performs a process of setting the maximum number of times of retransmission. For example, the setting unit 133 calculates the importance level of a frame by a process similar to that in the first embodiment, and sets the maximum number of times of retransmission according to the calculated importance level.

Next, in step S704, the wireless communication unit 110 transmits a multicast frame.

Next, in step S706, the wireless communication unit 110 receives an ACK frame which is transmitted back from a wireless terminal 200 which has succeeded in receiving the multicast frame transmitted in step S104. At this time, the communication control unit 131 reads identification information of the wireless terminal 200 which is the transmission source, from the ACK frame received from the wireless terminal 200, and stores the identification information, as a terminal from which the reception of the multicast frame has resulted in success, in the storage unit 120. The communication control unit 131 performs a similar process each time retransmission is subsequently performed, and manages terminals of a multicast group which have succeeded in reception, and the other terminals which have failed. As the identification information of a wireless terminal 200, a MAC address may be used, for example.

Next, in step S708, the communication control unit 131 determines whether or not there is any wireless terminal 200 that has not transmitted an ACK frame back. Specifically, the communication control unit 131 determines whether or not there is any wireless terminal 200 that has not transmitted an ACK frame back, of the wireless terminals 200 belonging to a multicast group.

If there is a wireless terminal 200 which has not transmitted an ACK frame back (S708/YES), in step S710 the communication control unit 131 performs a process of determining the number of times of retransmission. Specifically, the communication control unit 131 determines whether or not the number of times of retransmission performed in step S718 described below has reached the maximum number of times of retransmission set in step S702.

If the number of times of retransmission is less than the maximum number of times of retransmission (S712/YES), in step S714 the retransmission method determination unit 135 performs a retransmission method determination process. This process is as described above with reference to FIG. 5.

Next, in step S716, the retransmission timing determination unit 137 performs a retransmission liming determination process. This process is as described above with reference to FIG. 6.

Thereafter, in step S718, the wireless communication unit 110 retransmits the frame. Here, the wireless communication unit 110 may perform multicast transmission, perform unicast transmission, perform beamforming, or perform transmission without directivity, depending on the process result in step S714. Also, the wireless communication unit 110 retransmits the frame at a retransmission timing indicated by the process result in step S716.

Thereafter, the process returns to step S706 again.

Meanwhile, if it is determined in step S708 that there is not a wireless terminal 200 which has not transmitted an ACK frame back (S708/NO), or if the number of times of retransmission has reached the maximum number of times of retransmission (S712/NO), the process is ended. Thereafter, for example, for frames following the frame transmitted in step S704, step S702 and following steps are repeated performed.

In the foregoing, a flow example of the retransmission process according to this embodiment has been described.

4. Application Examples

The technology according to the present disclosure is applicable to various products. For example, the wireless terminal 200 may be implemented as a mobile terminal, such as a smartphone, tablet personal computer (PC), notebook PC, hand-held game terminal, digital camera, or the like, a stationary terminal, such as a television set, printer, digital scanner, network storage, or the like, or an on-vehicle terminal, such as a car navigation apparatus or the like. Also, the wireless terminal 200 may be implemented as a terminal for performing machine-to-machine (M2M) communication (also referred to as a machine type communication (MTC) terminal), such as a smart meter, vending machine, remote monitoring apparatus, point of sale (POS) terminal, or the like. Furthermore, the wireless terminal 200 may be a wireless communication module (e.g., an integrated circuit module configured on a single the) mounted on these terminals.

Meanwhile, for example, the base station 100 may be implemented as a wireless LAN access point (also referred to as a wireless base station) which has a router function or does not have a router function. Also, the base station 100 may be implemented as a mobile wireless LAN router. Furthermore, the base station 100 may be a wireless communication module (e.g., an integrated circuit module configured on a single die) which is mounted on these apparatuses.

Figure 10:
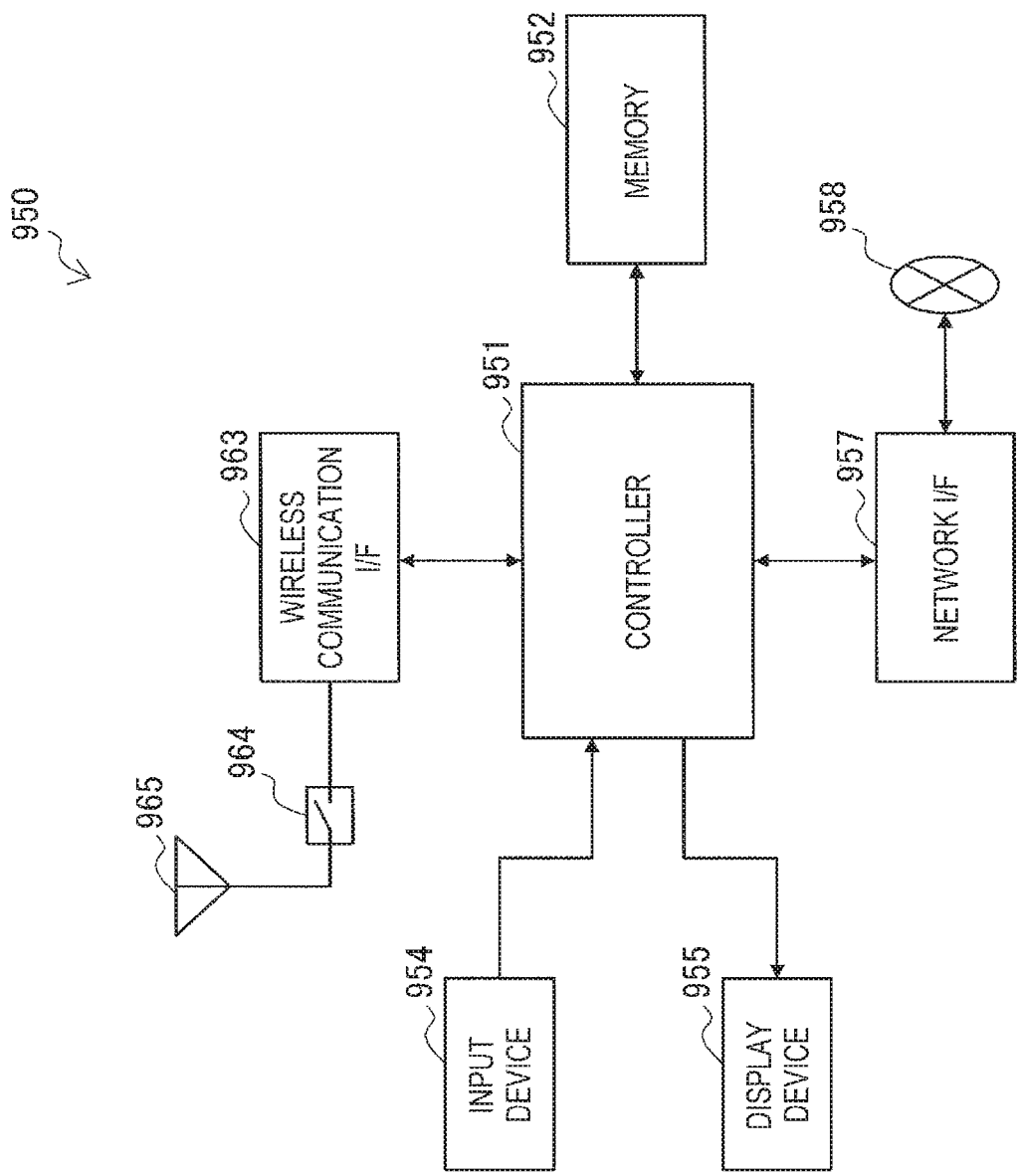
FIG. 10 is a block diagram showing a schematic configuration example of a wireless access point.

FIG. 10 is a block diagram showing a schematic configuration example of a wireless access point 950 to which the technology according to the present disclosure is applied. The wireless access point 950 includes a controller 951, a memory 952, an input device 954, a display device 955, a network interface 957, a wireless communication interface 963, an antenna switch 964, and an antenna 965.

The controller 951 may be for example, a CPU or a digital signal processor (DSP), and operates various functions (e.g., access restriction, routing, encryption, fire wall, log management, etc.) of the internet protocol (IP) layer and higher layers of the wireless access point 950. The memory 952 includes a RAM and a ROM, and stores a program executed by the controller 951 and various kinds of control data (e.g., a terminal list, routing table, encryption key, security setting, log, etc.).

The input device 954 includes, for example, a button, switch, or the like, and accepts the user's operation. The display device 955 includes an LED lamp or the like, and displays the status of an operation of the wireless access point 950.

The network interlace 957 is a wired communication interface for allowing the wireless access point 950 to connect to a wired communication network 958. The network interface 957 may include a plurality of connection terminals. The wired communication network 958 may be a LAN, such as Ethernet (registered trademark) or the like, or a wide area network (WAN).

The wireless communication interface 963 supports one or more of wireless LAN standards, such as IEEE802.11a, 11b, 11g, 11n, 11AC, and 11ad, and the like, and provides a wireless connection as an access point to neighboring terminals. The wireless communication interface 963 may typically include a baseband processor, RF circuit, power amplifier, and the like. The wireless communication interface 963 may be a one-chip module on which a memory for storing a communication control program, a processor for executing the program, and related circuits are integrated. The antenna switch 964 switches a connection of the antenna 965 between a plurality of circuits included in the wireless communication interface 963. The antenna 965 has a single antenna element or a plurality of antenna elements, and is used for transmission and reception of a wireless signal by the wireless communication interface 963.

In the wireless access point 950 shown in FIG. 10, the wireless communication unit 110, the storage unit 120, and the control unit 130, which have been described with reference to FIG. 2, may be implemented in the wireless communication interface 963. Also, at least a portion of these functions may be implemented in the controller 951. For example, if the wireless access point 950 functions as the base station 100, the wireless access point 950 can perform retransmission control in which wireless resources are more efficiently utilized, on wireless terminals within the coverage of the wireless access point 950.

5. Conclusion

In the foregoing, the technology according to one embodiment of the present disclosure has been described in detail with reference to FIG. 1 to FIG. 10. As described above, the base station 100 according to this embodiment performs wireless communication, particularly multicast transmission, with wireless terminals 200, and sets a threshold for determining whether or not it is necessary to perform a retransmission process, depending on information about reception of an ACK frame corresponding to multicast transmission from wireless terminals 200. By setting the threshold, the base station 100 can be restrained from performing retransmission even when a portion of the wireless terminals 200 belonging to a multicast group have not transmitted an ACK frame back. As a result, the base station 100 can perform retransmission control in which the number of times of retransmission, and the number of times of transmission of an ACK frame accompanying retransmission, are reduced, whereby wireless resources can be more efficiently utilized.

In the communication system 1 according to this embodiment, the dropping of a wireless data frame can be reduced, leading to an increase in data transmission quality, compared to a communication system which docs not use an ACK frame. Furthermore, in the communication system 1 according to this embodiment, unnecessary retransmission or the number of ACK frames can be reduced, which contributes to a reduction in power consumption in the base station 100 and the wireless terminals 200, even compared to a communication system which uses an ACK frame.

Also, the base station 100 has the retransmission method determination unit 135 and the retransmission timing determination unit 137, and can retransmit a frame using a method and at a retransmission timing which are suitable to contribute to an improvement in the system throughput.

Also, the setting unit 133 calculates the importance level of a frame, and sets the threshold on the basis of the importance level. As a result, the base station 100 can adjust the amount of wireless resources which are consumed in retransmission, depending on the importance level. For example, the setting unit 133 sets a high threshold for a frame having a high importance level, and sets a low threshold for a frame having a low importance level. In this case, the base station 100 can give priority to reliable reception by allocating wireless resources for a frame having a high importance level, and can give priority to improvement of the system throughput by limiting consumption of wireless resources for a frame having a low importance level.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the foregoing, it has been described that the setting unit 133 sets a high threshold for a frame having a high importance level, and sets a low threshold for a frame having a low importance level. The present technology is not limited to this example. For example, the setting unit 133 may set a low threshold for a frame having a high importance level, and sets a high threshold for a frame having a low importance level. Alternatively, the setting unit 133 may set a higher threshold as the importance level is closer to a predetermined value, and set a lower threshold as the importance level is further away from the predetermined value.

Also, the method of calculating the importance level by the setting unit 133 has been described using a specific example. The present technology is not limited to this example. For example, an index of an upper layer and the importance level have arty relationship. Specifically, in the foregoing, the setting unit 133 may calculate that the importance level is high for a frame containing data of the base layer, and calculate that the importance level is low for a frame containing data of the enhancement layer. The present technology is not limited to this example. For example, the setting unit 133 may calculate that the importance level is low for a frame containing data of the base layer, and calculate that the importance level is high for a frame containing data of the enhancement layer. The same applies to other methods of calculating the importance level.

Also, in the foregoing, an example has been described in which the communication system 1 is a system compliant with wireless LAN or a communication standard similar to this. The present technology is not limited to this. For example, the communication system 1 may be a system compliant with other communication standards.

Also, in the foregoing, an example has been described in which a main entity which performs retransmission control is the base station 100. The present technology is not limited to this. For example, a wireless terminal, such as a smartphone or the like, may be a main entity which performs retransmission control. Also, in addition to the communication form in which the base station 100 is a center of wireless communication, the communication system 1 may be, for example, in a peer-to-peer (P2P) type communication form. In this case, a wireless terminal which performs P2P communication may perform retransmission control.

Also, the embodiments and variations of the present disclosure may be combined as appropriate.

The series of control processes carried out by each apparatus described in the present specification may be realized by software, hardware, or a combination of software and hardware. Programs that compose such software may be stored in advance for example on a storage medium (non-transitory medium) provided inside or outside each of the apparatus. As one example, during execution, such programs are written into RAM (Random Access Memory) and executed by a processor such as a CPU.

Note that it is not necessary for the processing described in this specification with reference to the flowchart to be executed in the order shown in the flowchart. Some processing steps may be performed in parallel. Further, some of additional steps can be adopted, or some processing steps can be omitted.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A wireless communication apparatus including:

a wireless communication unit configured to perform wireless communication with a terminal apparatus;

a communication control unit configured to control multicast transmission performed by the wireless communication unit; and a setting unit configured to set a threshold for determining whether or not it is necessary for the communication control unit 10 perform a retransmission process, on the basis of information about reception of a reception acknowledgment response corresponding to the multicast transmission from the terminal apparatus.

(2)

The wireless communication apparatus according to (1). wherein the threshold is a threshold related to a number of the terminal apparatuses which have transmitted back the reception acknowledgment response corresponding to the multicast transmission.

(3)

The wireless communication apparatus according to (1). wherein the threshold is a threshold related to a proportion of the terminal apparatuses which have transmitted back the reception acknowledgment response corresponding to the multicast transmission to the terminal apparatuses which are a destination of the multicast transmission.

(4)

The wireless communication apparatus according to (1), wherein the threshold is a threshold related to a number of times of retransmission of a frame which has been subjected to the multicast transmission.

(5)

The wireless communication apparatus according to any one of (1) to (4), wherein the information about reception of the reception acknowledgment response is information indicating an importance level of a transmitted frame for which reception of the reception acknowledgment response has resulted in failure, and wherein the setting unit calculates the importance, level on the basis of information about a multicast frame for which reception of the corresponding reception acknowledgment response has resulted in failure.

(6)

The wireless communication apparatus according to (5), wherein the setting unit calculates the importance level on the basis of an index of an upper layer related to data contained in the multicast frame.

(7)

The wireless communication apparatus according to (6), wherein the index of the upper layer contains information indicating a hierarchical level of encoding of the data encoded by a hierarchical encoding technique.

(8)

The wireless communication apparatus according to (6) or (7).

wherein the index of the upper layer contains information indicating whether or not the data contains at least any one of video and audio.

(9)

The wireless communication apparatus according to any one of (6) to (8), wherein the index of the upper layer contains information indicating a dependence relationship between the data and other data.

(10)

The wireless communication apparatus according to any one of (6) to (9), wherein the index of the upper layer contains information indicating whether or not the data contains a time stamp.

(11)

The wireless communication apparatus according to any one of (6) to (10), wherein the index of the upper layer contains information indicating whether or not the data contains a protocol header of the upper layer.

(12)

The wireless communication apparatus according to any one of (5) to (11), wherein the setting unit calculates the importance level on the basis of a transmission setting which has been used in transmission of the multicast frame.

(13)

The wireless communication apparatus according to (12), wherein the transmission setting contains a setting for performing transmission using a bundle of a plurality of frequency channels.

(14)

The wireless communication apparatus according to any one of (5) to (13), wherein the setting unit calculates the importance level on the basis of information about a media access control (MAC) layer of the multicast frame.

(15)

The wireless communication apparatus according to (14), wherein the information about the MAC layer contains information indicating a type of the multicast frame.

(16)

The wireless communication apparatus according to (14) or (15), wherein the information about the MAC layer contains information indicating a data amount of the multicast frame.

(17)

The wireless communication apparatus according to any one of (1) to (16), further including:

a retransmission method determination unit configured to determine a transmission method in the retransmission process performed by the communication control unit, on the basis of information about the terminal apparatus which has failed to receive the reception acknowledgment response corresponding to the multicast transmission.

(18)

The wireless communication apparatus according to any one of (1) to (17), further including, a retransmission timing determination unit configured to determine a timing at which the communication control unit is to perform the retransmission process.

(19)

A wireless communication method for use in a wireless communication apparatus which performs wireless communication with a terminal apparatus, the method including:

controlling multicast transmission using a processor, and setting a threshold for determining whether or not it is necessary to perform a retransmission process, on the basis of information about reception of a reception acknowledgment response corresponding to the multicast transmission from the terminal apparatus.

(20)

A program for causing a computer to function as a wireless communication unit configured to perform wireless communication with a terminal apparatus;

a communication control unit configured to control multicast transmission performed by the wireless communication unit, and a setting unit configured to set a threshold for determining whether or not it is necessary for the communication control unit to perform a retransmission process, on the basis of information about reception of a reception acknowledgment response corresponding to the multicast transmission from the terminal apparatus.

REFERENCE SIGNS LIST 1 communication system
100 base station
110 wireless communication unit
120 storage unit
130 control unit
131 communication control unit
133 setting unit
135 retransmission method determination unit
137 retransmission timing determination unit
200 wireless terminal

The invention claimed is:

1. A wireless communication apparatus comprising:
circuitry configured to:
  transmit a multicast packet to wireless terminals that belong to a same multicast group;
  receive at least one acknowledgement (ACK) information from at least one of the wireless terminals, each of the ACK information indicating an acknowledgement of the sent multicast packet and being associated with a respective one of the wireless terminals;
  determine whether a number of the wireless terminals that have transmitted the at least one ACK information satisfies a predetermined threshold, based on identifiers of the wireless terminals respectively derived from the received ACK information; and
  retransmit the multicast packet based on a determination result of whether the number of the wireless terminals satisfies the predetermined threshold or not,
  wherein the threshold is determined based on an index associated with the transmitted multicast packet and the multicast group, and the index comprises information indicating an importance level of the transmitted multicast packet.

2. The wireless communication apparatus according to claim 1,
wherein the threshold is a threshold related to the number of the wireless terminals that have transmitted the at least one ACK information.

3. The wireless communication apparatus according to claim 1,
wherein the threshold is related to a proportion of the wireless terminals that have transmitted the at least one ACK information.

4. The wireless communication apparatus according to claim 1,
wherein the threshold is related to the number of times of retransmission of a packet that has been subjected to multicast transmission.

5. The wireless communication apparatus according to claim 1,
wherein the circuitry is further configured to calculate the importance level based on information about a multicast packet for which reception of the corresponding at least one ACK information has resulted in failure.

6. The wireless communication apparatus according to claim 5,
wherein the circuitry is further configured to calculate the importance level based on an index of an upper layer related to data contained in the multicast packet.

7. A wireless communication method, comprising:
transmitting a multicast packet to wireless terminals that belong to a same multicast group;
receiving at least one acknowledgement (ACK) information from at least one of the wireless terminals, each of the ACK information indicating an acknowledgement of the sent multicast packet and being associated with a respective one of the wireless terminals;
determine whether a number of the wireless terminals that have transmitted the at least one ACK information satisfies a predetermined threshold, based on identifiers of the wireless terminals respectively derived from the received ACK information; and
retransmitting the multicast packet based on a determination result of whether the number of the wireless terminals satisfies the predetermined threshold or not,
wherein the threshold is determined based on an index associated with the transmitted multicast packet and the multicast group, and the index comprises information indicating an importance level of the transmitted multicast packet.

8. A non-transitory computer-readable medium storing instructions that, when executed by one or more processors of a wireless communication apparatus, cause the wireless communication apparatus to:

transmit a multicast packet to wireless terminals that belong to a same multicast group;

receive at least one acknowledgement (ACK) information from at least one of the plurality of wireless terminals, each of the ACK information indicating an acknowledgement of the sent multicast packet and being associated with a respective one of the wireless terminals;

determine whether a number of the wireless terminals that have transmitted the at least one ACK information satisfies a predetermined threshold, based on identifiers of the wireless terminals respectively derived from the received ACK information; and retransmit the multicast packet based on a determination result of whether the number of the wireless terminals satisfies the predetermined threshold or not, wherein the threshold is determined based on an index associated with the transmitted multicast packet and the multicast group, and the index comprises information indicating an importance level of the transmitted multicast packet.

* * * * *